(12) United States Patent
Osaki

(10) Patent No.: US 7,558,468 B2
(45) Date of Patent: Jul. 7, 2009

(54) DISK RECORDING/REPRODUCING APPARATUS, DATA RECORDING APPARATUS, AND DISK RECORDING/REPRODUCING METHOD

(75) Inventor: Mitsuharu Osaki, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 867 days.

(21) Appl. No.: 10/899,038

(22) Filed: Jul. 27, 2004

(65) Prior Publication Data

US 2005/0025468 A1     Feb. 3, 2005

(30) Foreign Application Priority Data

Jul. 28, 2003     (JP)     ............................ P.2003-202291

(51) Int. Cl.
*H04N 7/00*     (2006.01)
*H04N 5/00*     (2006.01)

(52) U.S. Cl. ........................... 386/95; 386/125; 386/126
(58) Field of Classification Search .................. 386/95, 386/125–126
See application file for complete search history.

(56) References Cited

FOREIGN PATENT DOCUMENTS

| | | |
|---|---|---|
| JP | 10-4991 | 1/1998 |
| JP | 11-259957 | 3/1999 |
| JP | 11259957 A * | 9/1999 |
| JP | 2000-312323 | 11/2000 |
| JP | 2001-167516 | 6/2001 |
| JP | 2002-185921 | 6/2002 |
| WO | WO 03/036622 A2 | 5/2003 |

OTHER PUBLICATIONS

Official Translation of Komuro Tatsuya, JP 11-259,957, publication date: Sep. 1999.*

* cited by examiner

*Primary Examiner*—Thai Tran
*Assistant Examiner*—Daquan Zhao
(74) *Attorney, Agent, or Firm*—Morgan, Lewis & Bockius LLP

(57) ABSTRACT

A disk recording/reproducing apparatus includes a main control part which controls a recording part to record data of video or audio on a disk, a sub control part which controls an operation part having plural keys, and a storage part which stores a message to an effect that it is in recording and a record position of data on the disk. Preferably, in a case that power returns after a power failure, when the message to the effect is stored, the main control part searches data recorded based on the record position in a unit of first logical data, checks validity of control data, obtains a position of final valid first logical data, when the position is not a boundary of second logical data, obtains a position of final valid second logical data, and records subsequently new data from a position next to the position.

13 Claims, 10 Drawing Sheets

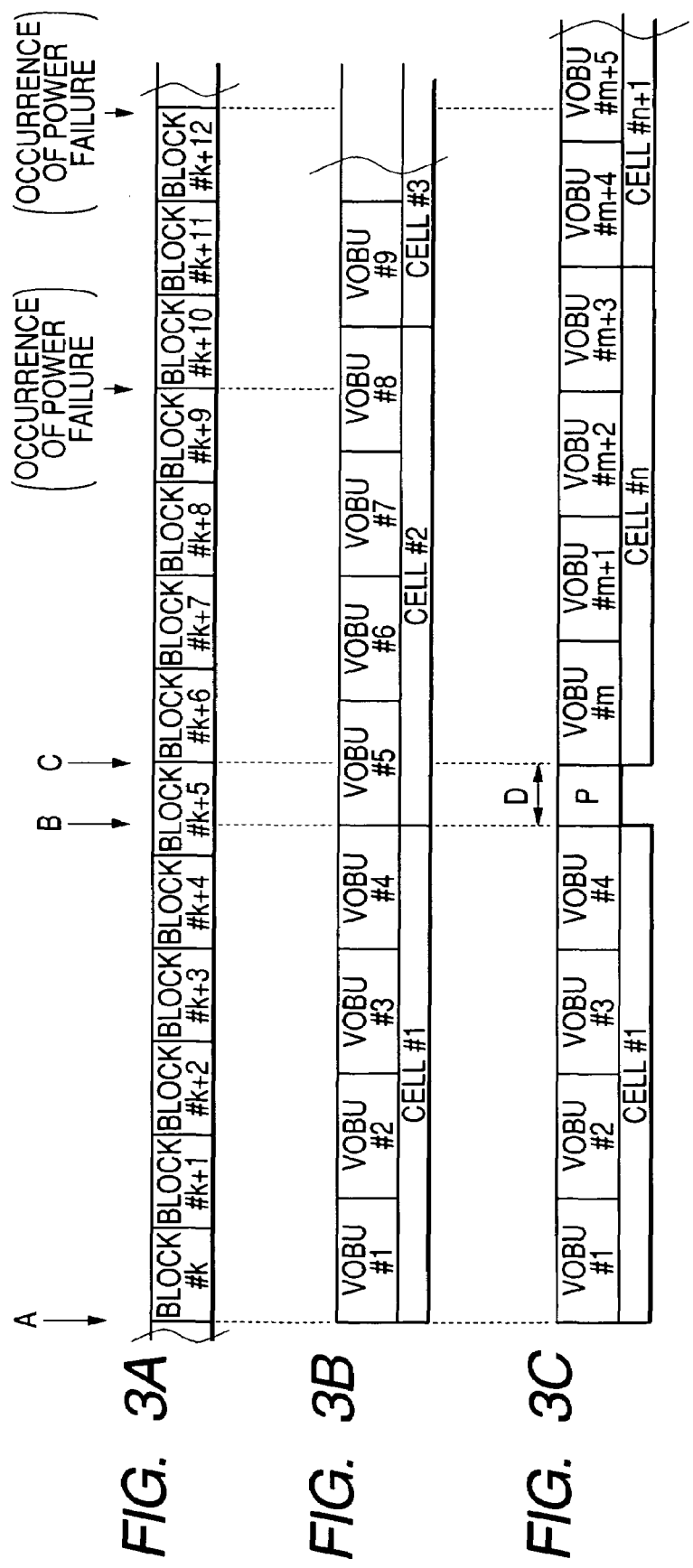

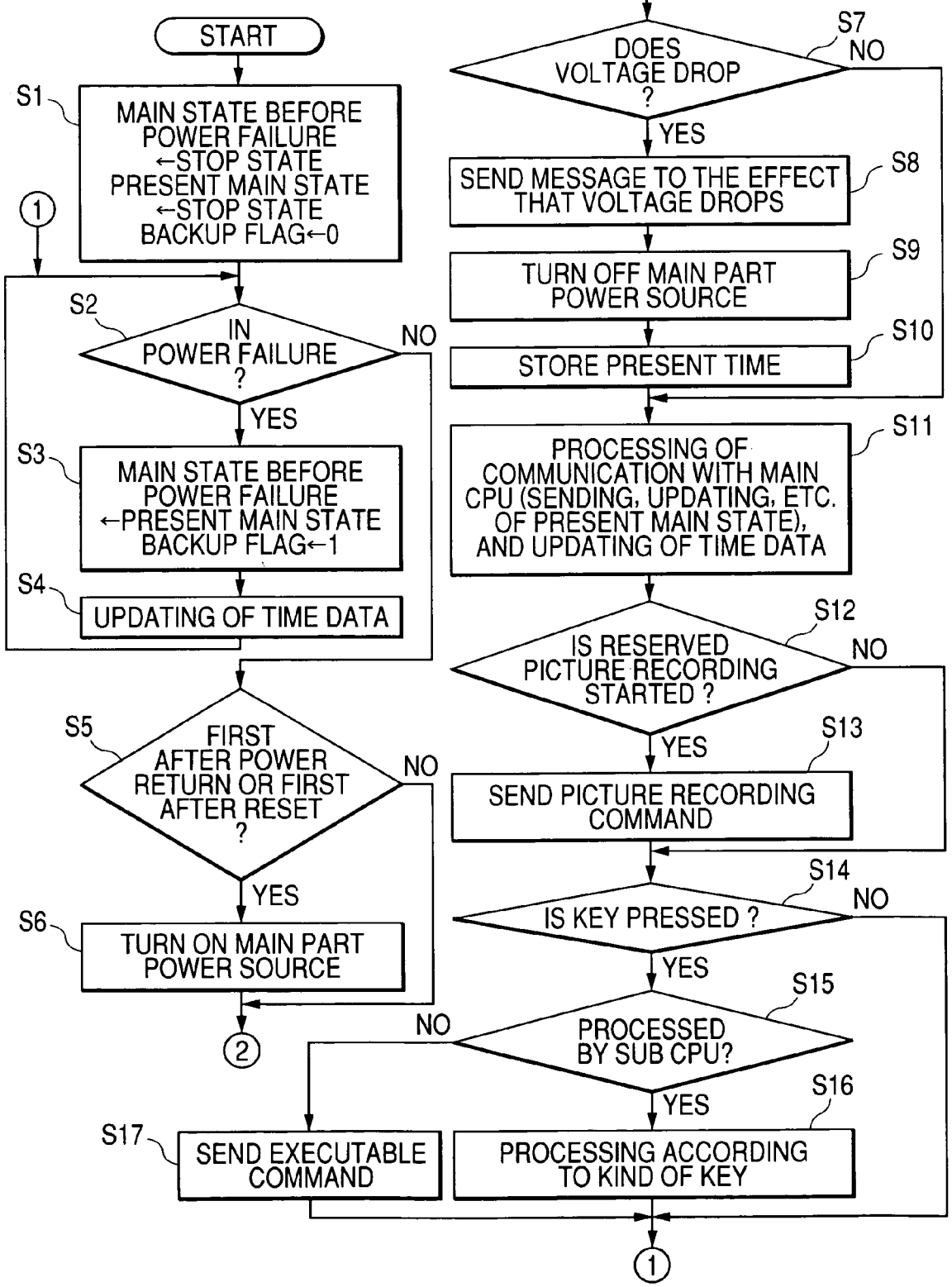

DISK RECORDING/REPRODUCING APPARATUS, DATA RECORDING APPARATUS, AND DISK RECORDING/REPRODUCING METHOD

BACKGROUND OF THE INVENTION

1. Field of the Invention

The present invention relates to a disk recording/reproducing apparatus, a data recording apparatus, and disk recording/reproducing method.

2. Description of the Related Art

A conventional DVD recorder is not constructed so that a power failure occurs during picture recording and even when the power returns thereafter, the picture recording can be resumed automatically. On the other hand, JP-A-2002-185921 (Paragraph 0112 to Paragraph 0125, Paragraph 0164, FIG. 7 to FIG. 9) shows handling of GOP (Group of Picture) with respect to a write error in an apparatus for recording a broadcast program on a hard disk, a DVD, etc. It is constructed so that an area which is a portion of GOP written into a cluster in which a write error occurs and is a portion of the GOP written into a normal cluster immediately before the cluster is set as a space area and new GOP is recorded from a normal cluster of another position.

Also, description in which in a dubbing apparatus, information about dubbing is stored in flash memory during dubbing and at the time of a power return after a power failure, the information about dubbing is read out of the flash memory and the dubbing is continued based on this information is shown in JP-A-2001-167516 (Abstract, FIG. 7, FIG. 8).

SUMMARY OF THE INVENTION

However, in the conventional means, there is a problem that the contents recorded before a power failure become useless. The means shown in JP-A-2002-185921 is not means for solving the conventional problem. Also, JP-A-2001-167516 merely shows general power failure measures.

The invention is means for solving the problems, and an object of the invention is to provide a disk recording and reproducing apparatus and a data recording apparatus capable of making recording subsequently after a power return even in case that a power failure occurs while data of video or audio is recorded on a record medium.

In the invention, a disk recording/reproducing apparatus includes a recording part which records data of video or audio on a disk, an operation part having plural keys, a main control part which controls the recording part, a sub control part which controls the operation part, and a storage part which stores a message to an effect that it is in recording on the disk and a record position of data on the disk. Preferably, in a case that power returns after a power failure, when the storage part stores the message to the effect that it is in recording, the main control part searches data recorded based on the record position in a unit of first logical data, checks validity of control data in the first logical data, obtains a first position as a last position of final valid first logical data, when the first position is not a boundary of second logical data, obtains a second position as a last position of final valid second logical data, and records subsequently new data on the disk from a position next to the last position. Preferably, the second logical data includes plural first logical data, and the final valid second logical data includes only the valid first logical data.

By being configured thus, a position of the final valid (normally recorded) second logical data recorded before a power failure can be obtained. As a result of this, new data after the power returns can be subsequently recorded from a position next to the final valid second logical data, and the contents recorded before the power failure do not become useless.

Also, in the invention, a data recording apparatus includes a recording part which records data of video or audio on a record medium, a control part which controls the recording part, a storage part which stores a message to the effect that it is in recording on the record medium and a record position of data on the record medium. Preferably, in a case that power returns after a power failure, when the storage part stores the message to the effect that it is in recording, the control part searches data recorded based on the record position in a unit of logical data, checks validity of control data in the logical data, obtains a first position of final valid logical data, and subsequently records new data on the record medium from a position next to the first position.

By being configured thus, a position of the final valid (normally recorded) logical data recorded before a power failure can be obtained. As a result of this, new data after the power returns can be subsequently recorded from a position next to the final valid logical data, and the contents recorded before the power failure do not become useless.

Also, in the invention, a disk recording/reproducing method includes, in a case that power returns after a power failure, when a message to an effect that it is in recording on a disk is stored, searching data recorded based on the record position of data on the disk in a unit of first logical data, checking validity of control data in the first logical data, obtaining a first position as a last position of final valid first logical data, when the first position is not a boundary of second logical data, obtaining a second position as a last position of final valid second logical data, and recording subsequently new data on the disk from a position next to the last position. Preferably, the second logical data includes plural first logical data, and the final valid second logical data includes only the valid first logical data.

BRIEF DESCRIPTION OF THE DRAWINGS

Preferred embodiments of the present invention will be described in detail based on the following figures, wherein:

FIGS. 3A to 3C are diagrams showing a relation between physical blocks and logical data of the DVD-RW;

FIG. 4 is a flowchart showing an action of a sub CPU;

DETAILED DESCRIPTION OF THE INVENTION

Figure 1:
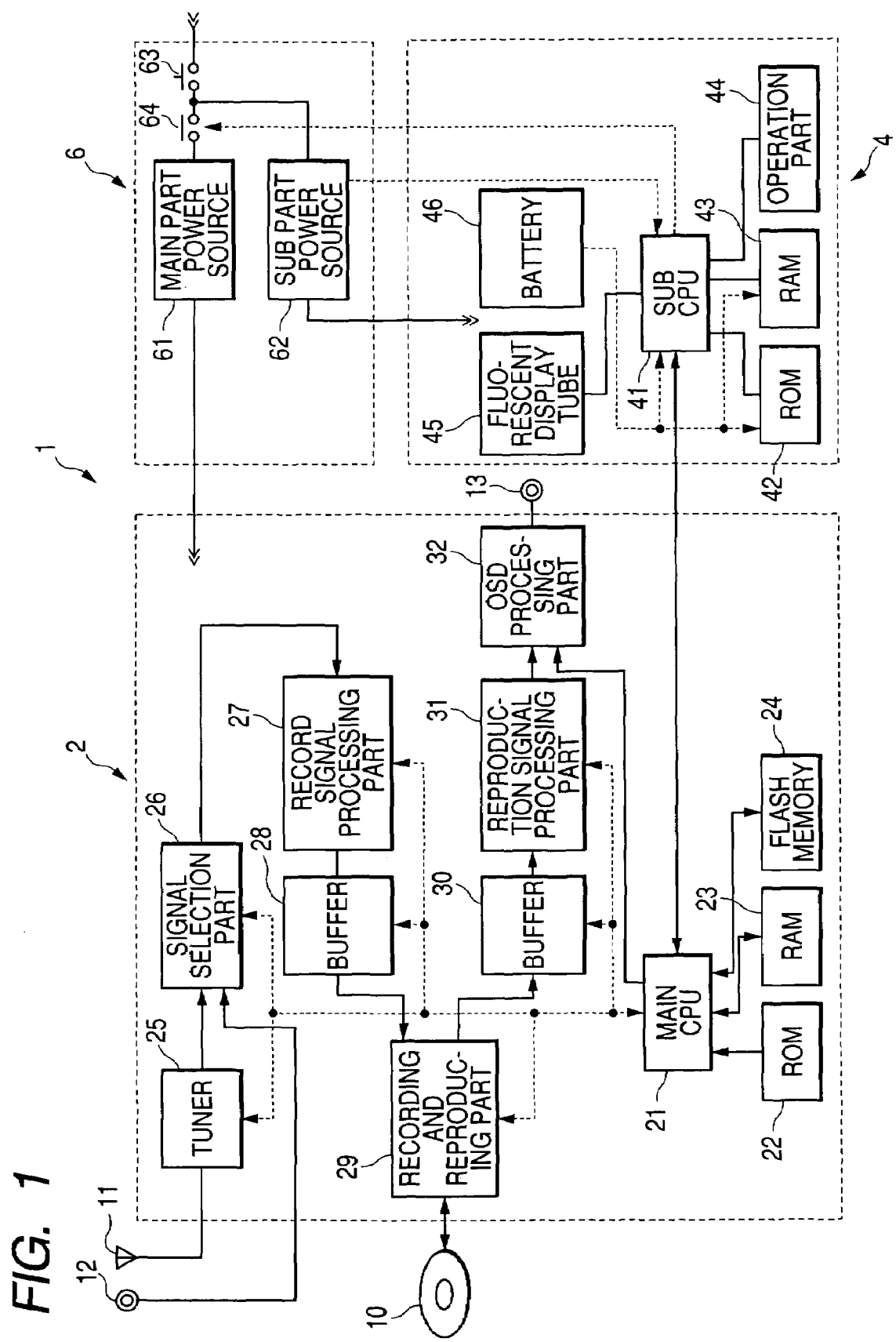
FIG. 1 is a block diagram of a disk recording and reproducing apparatus according to the invention.

FIG. 1 is a block diagram of a disk recording and reproducing apparatus 1 according to the invention. The disk recording and reproducing apparatus 1 includes a main part 2, a sub part 4 and a power source part 6.

First, a configuration of the main part 2 will be described. This main part 2 reproduces a disk 10 which is various record media such as a DVD or a CD, and makes recording on the writable disk 10. A broadcast signal received by an antenna 11 is tuned by a tuner 25 and is sent to a signal selection part 26. In the signal selection part 26, either the broadcast signal or a signal from an external input terminal 12 is selected by a signal from a main CPU 21 and is sent to a record signal processing part 27. In the record signal processing part 27, A/D conversion of an input signal is made and the input signal is encoded by, for example, an MPEG-2 method. The encoded signal is recorded on the disk 10 in a recording and reproducing part 29 after the encoded signal is temporarily stored in a buffer 28.

The recording and reproducing part 29 includes a tray for placing the disk 10 and carrying in or out the disk 10, a recording head for recording data on the disk 10, a reproducing head for reproducing data of the disk 10, and a rotary driving mechanism for rotating the disk 10 in the case of recording and reproducing. Also, the recording and reproducing part 29 is provided with a sensor and is constructed so that the presence or absence of the disk 10, an open state of the tray, etc. can be checked from the main CPU 21. Data of the disk 10 reproduced by the recording and reproducing part 29 is temporarily stored in a buffer 30 and then is decoded by a reproduction signal processing part 31 and thereafter D/A conversion is made and the data is sent to an on-screen display (hereinafter called "OSD") processing part 32.

The disk recording and reproducing apparatus 1 has an OSD function of superimposing various message data on background image data or reproduction data of the disk 10 and displaying the message data in order to notify a viewer of the presence or absence of the disk 10, an open state of the tray, etc. In some cases, OSD data and background image data stored in ROM 22 are combined by the main CPU 21 and are outputted from an external input terminal 13 through the OSD processing part 32 and are displayed on a television image receiver (not shown). In other cases, OSD data fetched from the ROM 22 is superimposed on reproduction data by the OSD processing part 32 and is outputted from the external input terminal 13.

The ROM 22, RAM 23 and flash memory 24 are connected to the main CPU 21. The OSD data and background image data described above and a program for controlling an action of the main part 2 are stored in the ROM 22. Various control data etc. are stored in the RAM 23. Also, the RAM 23 is used as a calculation work area of the main CPU 21. Data by which trouble is caused when the data disappears in case that a power failure occurs, for example, data (data to the effect that pictures are being recorded, a station number, record start time, etc.) used at the time of recording a broadcast program is stored in the flash memory 24.

Next, the sub part 4 will be described. ROM 42, RAM 43, an operation part 44 and a fluorescent display tube 45 are connected to a sub CPU 41. A program for controlling an action of the sub part 4 is stored in the ROM 42. Date and time (hereinafter called "time data") and various control data etc. are stored in the RAM 43. Also, the RAM 43 is used as a calculation work area of the sub CPU 41. The operation part 44 includes plural keys such as a "picture recording" key or a "halt" key provided in a front panel (not shown) of the present disk recording and reproducing apparatus 1, and a remote controller (not shown) having multiple keys. When any key is pressed, a signal is sent to the sub CPU 41 and processing according to a kind of key is performed.

Date and time and other message information indicating an action state of the disk recording and reproducing apparatus 1 are displayed on the fluorescent display tube 45. Also, the sub part 4 is provided with a battery 46 and its output is supplied to the sub CPU 41, the ROM 42 and the RAM 43. Therefore, the sub CPU 41 operates even during a power failure. The sub CPU 41 is connected to the main CPU 21 and various data are sent and received between both the CPUs 21 and 41. Also, in the sub CPU 41, a timer is incorporated and interrupt signals are generated every certain time (for example, 1 ms) and time data stored in the RAM 43 is updated by an interrupt processing program. Also, the time data is set by inputting data from a key of the operation part 44.

Then, the power source part 6 will be described. An AC of 100 V is supplied to a sub part power source 62 through a power source switch 63 and its DC output is supplied to the sub part 4. Also, the AC of 100 V is supplied to a main part power source 61 through the power source switch 63 and a switching switch 64 and its DC output is supplied to the main part 2. The switching switch 64 is turned on or off by the sub CPU 41. Incidentally, even in case that the AC of 100 V fails, outputs of both the power sources 61, 62 are held for a predetermined time (for example, 100 ms) and during this time, processing at the time of turning off a power source is performed by the main CPU 21. Also, the sub part power source 62 is constructed so that occurrence of a power failure and a decrease in voltage of the AC of 100 V can be detected without delay, and these states are detected by the sub CPU 41.

Figure 2A:
FIGS. 2A to 2F are diagrams hierarchically showing a data structure of a DVD or a DVD-RW of DVD-Video standards.
Figure 2B:
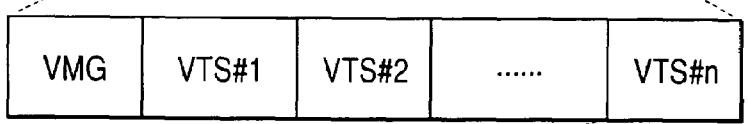

FIGS. 2A to 2F are diagrams hierarchically showing a data structure of a DVD (or DVD-RW of DVD-Video standards). FIG. 2A represents volume space of the DVD, and the volume space includes a volume and file configuration zone, a DVD video zone and other zones. The DVD video zone includes a video manager VMG (hereinafter called "VMG") and video title sets VTS (hereinafter called "VTS") (#1 to #n) as shown in FIG. 2B. The VMG is a table showing the contents of all the video title sets, and includes control data called video manager information VMGI, a video object set for VMG menu display and control data for backup.

Figure 2C:
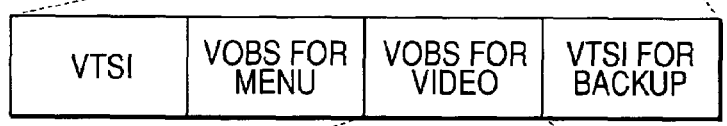

The VTS (#1 to #n) are a set of titles, and each the VTS includes control data called video title set information VTSI (hereinafter called "VTSI"), a video object set VOBS (hereinafter called "VOBS") for menu for VTS menu display, a VOBS for video for video display and control data for backup as shown in FIG. 2C.

Figure 2D:
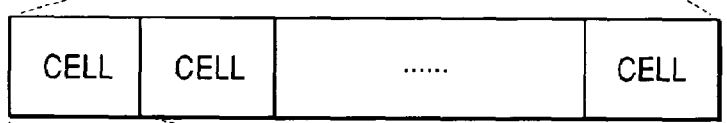
Figure 2E:
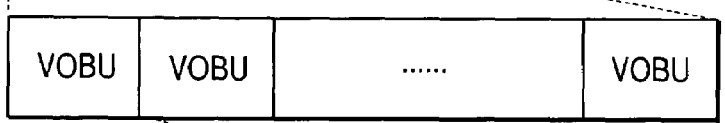
Figure 2F:

The VOBS for video of the VTS includes plural cells as shown in FIG. 2D. The cell (second logical data of the invention) is a basic unit of contents recorded and reproduced, and switching of video is performed in this cell unit. Also, each the cell includes plural video object units VOBU (hereinafter called "VOBU") as shown in FIG. 2E. Then, each the VOBU (first logical data of the invention) includes a navigation pack N-PK (hereinafter called "N-PK"), a video pack, an audio pack and a sub-picture pack as shown in FIG. 2F. Each of the packs may be one, or may be two or more.

The N-PK is placed in the head of the VOBU, and is mainly used as control data for performing data retrieval or reproduction display control of data inside the VOBU belonging. The video pack is main video data in which a video signal is compressed according to MPEG standards. The audio pack is an audio data in which an audio signal is processed by a PCM method etc. The sub-picture pack is sub video data in which run-length compression processing of a signal of a caption etc. is performed.

FIGS. 3A to 3C are diagrams showing a relation between physical blocks (hereinafter called "block") and logical data of the DVD-RW. FIG. 3A is a diagram showing a list of the blocks, and FIG. 3B is a diagram showing VOBU and cells recorded in the blocks before a power failure, and FIG. 3C is a diagram showing VOBU and cells recorded in the blocks before a power failure and after a power return. A form in which logical data is recorded in physical blocks and, for example, a form in which a power failure occurs during recording of a broadcast signal and the power returns and thereafter the broadcast signal is recorded subsequently are shown with reference to FIGS. 3A to 3C. In FIGS. 3A to 3C, a size of the VOBU is shown larger than a size of the block, but the size of the VOBU may be smaller than the size of the block.

First, when a VOBU #1 is stored in the buffer 28, the former portion of the VOBU #1 is recorded in a block #k as shown in FIGS. 3A and 3B. Next, when a VOBU #2 is stored in the buffer 28, the latter portion of the VOBU #1 and the former portion of the VOBU #2 are recorded in a block #k+1. Then, it is assumed that a power failure occurs at the time of attempting to record the latter portion of a VOBU #8 and the former portion of a VOBU #9 in a block #k+10 after VOBUs #3 to #7 and the former portion of the VOBU #8 are recorded in blocks #k+2 to #k+9. An action of the main part 2 stops due to the power failure, so that the latter portion of the VOBU #8 is not recorded in the block #k+10. Incidentally, an N-PK is present in the head of the VOBU, so that N-PK of the VOBU #8 is recorded in the block #k+9.

Next, the case of subsequently recording a broadcast signal on the DVD-RW after the power returns will be described. An address of a position A is stored in the flash memory 24, so that it is checked whether or not data of each the VOBU is valid sequentially from the VOBU #1. Also, a size of the VOBU is recorded in N-PK of the VOBU, so that an address of the next VOBU can be obtained by sequentially adding this size to the address of the position A. In this manner, it is decided that the data to the VOBU #7 is valid. However, since the latter portion of the VOBU #8 is not recorded in the block #k+10, it is decided that the VOBU #8 is not valid. Also, since N-PK of the VOBU #9 is not recorded, it is decided that the VOBU #8 is not valid. Further, since a readout error occurs in the case of reading out the block #k+10, it is decided that the VOBU #8 is not valid.

On the other hand, the cell is a basic unit of contents recorded and reproduced, so that a cell #2 including the invalid VOBU #8 is invalid. Thus, as shown in FIG. 3C, padding data P is embedded in a portion D (range from a position B to a position C) recorded in the block #k+5 of the VOBU #5 of the head of the cell #2, that is, in a space area D of the block #k+5, and a VOBU #m of a new broadcast signal is subsequently recorded from the head (position C) of the block #k+6, and further VOBUs #m+1 to #m+5 are recorded in blocks #k+7 to #k+12. In this manner, even in case that recording of a broadcast program is suspended due to a power failure, the broadcast program is subsequently recorded after the power returns.

Then, the case that a power failure occurs after the former portion of a VOBU #m+5 shown in FIG. 3C is recorded in a block #k+12 will be described. Also at this time, it is decided that data to the VOBU #4 is valid in a manner similar to the case described above. Then, when the next VOBU is checked, the padding data P recorded in the space area D is read out. As a result of this, it is decided that data of the VOBU is invalid, but the invention is constructed so as to skip this padding data. In other words, when it is decided that it is invalid, it is constructed so that an address of the next VOBU is set in a position of the head of the immediately subsequent block, that is, a position of the head of a block #k+6 and it is decided whether a VOBU present in the position (position C) is valid or not. In FIG. 3C, since a VOBU #m is recorded in the position C, it is decided that the VOBU is valid, and it is subsequently checked whether or not data of the following VOBUs is valid.

Next, an action for implementing the description explained in FIGS. 3A to 3C will be described using flowcharts of FIGS. 4 to 10. FIG. 4 is a flowchart showing an action of the sub CPU 41. Here, the case that power source backup of the sub CPU 41, the ROM 42 and the RAM 43 is performed by the battery 46 will be described. "A main state before a power failure", "a present main state" and "a backup flag" in this flowchart are variables stored in the RAM 43 of the sub part 4. The main CPU 21 obtains access to these variables through the sub CPU 41, but for convenience of description, it is expressed as if access could be obtained directly in each the flowchart.

First, when the sub CPU 41 is reset, after predetermined initialization processing is performed, stop states are set to "the main state before the power failure" and "the present main state" and 0 is set to "the backup flag" (S1). Since a power source of the sub CPU 41 is backed up, S1 is not executed by only turning on or off the power source switch 63. The sub CPU 41 is reset, for example, by pressing keys of the operation part 44 in special combination.

Next, it is checked whether or not it is in power failure (S2). This decision is made by checking a signal of a power failure state of the sub part power source 62. In the case of being in power failure, the contents of "the present main state" are set to "the main state before the power failure" and 1 is set to "the backup flag" (S3). Only in the case that a power source of the sub CPU 41 is backed up, S3 is executed, so that the main CPU 21 can decide whether or not the power source of the sub CPU 41 is backed up, i.e., whether or not data stored in the RAM 43 of the sub part 4 is retained, by checking whether or not "the backup flag" is 1. Then, time data is updated (S4) and the flowchart returns to S2. The time data is updated by interrupt processing actually, but for convenience of description, the description is made thus.

In the case of being decided that it is not in power failure in S2, it is decided whether or not the flowchart passes through this step first after a power return or passes through this step first after a reset (S5). In the case of being decided that it is YES, the main part power source 61 is turned on by turning on the switching switch 64 by a signal from the sub CPU 41 (S6). As a result of this, the main CPU 21 starts an action. Thereafter, the flowchart proceeds to S7. In the case of being decided that it is NO, the flowchart proceeds to S7 without doing something.

In S7, it is checked whether or not a voltage drops by seeing a signal of a voltage drop state of the sub part power source 62. When the voltage does not drop, the flowchart proceeds to S11. When the voltage drops, a message to the effect that the voltage drops is sent to the main CPU 21 (S8). The main CPU 21 which has received the message performs processing for turning off a power source, and sends a completion notification to the sub CPU 41 after the completion of the processing. The sub CPU 41 which has received the completion notification turns off the main part power source 61 by turning off the switching switch 64 (S9). Then, the time data stored in the RAM 43 of the sub part 4 is stored (held) in another area of the RAM 43 as time data at the time of the power failure (S10), and the flowchart proceeds to S11.

In S11, processing of communication with the main CPU 21 and updating of the time data are performed. For example, when data for updating "the present main state" is received from the main CPU 21, its data is set to "the present main state". Also, in the case of inquiring about the contents of "the present main state", the contents are sent to the main CPU 21. Then, it is checked whether or not reserved picture recording is started by comparing the present time with picture recording reservation time of a broadcast program stored in the RAM 43 (S12). When the picture recording is not started, the flowchart proceeds to S14. When the picture recording is started, a picture recording command is sent to the main CPU 21 (S13) and the flowchart proceeds to S14. Incidentally, control is naturally performed so that the same picture recording is not started repeatedly.

In S14, it is checked whether or not a key of the operation part 44 is pressed. When the key is not pressed, the flowchart returns to S2. When the key is pressed, it is checked whether or not processing by pressing the key is something to be processed by the sub CPU 41 from a kind of the key, progress of a key pressed before the key, the contents of "the present main state" and soon (S15). When the processing is something to be processed by the sub CPU 41, the sub CPU 41 performs processing according to a kind of the key (S16). For example, when picture recording reservation of a broadcast program is made, picture recording start time, time at the time of picture recording, a station number, etc. are stored in the RAM 43. When the processing is not something to be processed by the sub CPU 41, an executable command is sent to the main CPU 21 (S17). For example, a picture recording command is sent when a "picture recording" key is pressed while a broadcast program is received by a television image receiver, and a halt command is sent when a "halt" key is pressed during picture recording, and a stop command is sent when a "stop" key is pressed during picture recording or a halt. After S16 or S17 is executed, the flowchart returns to S2.

Figure 5:
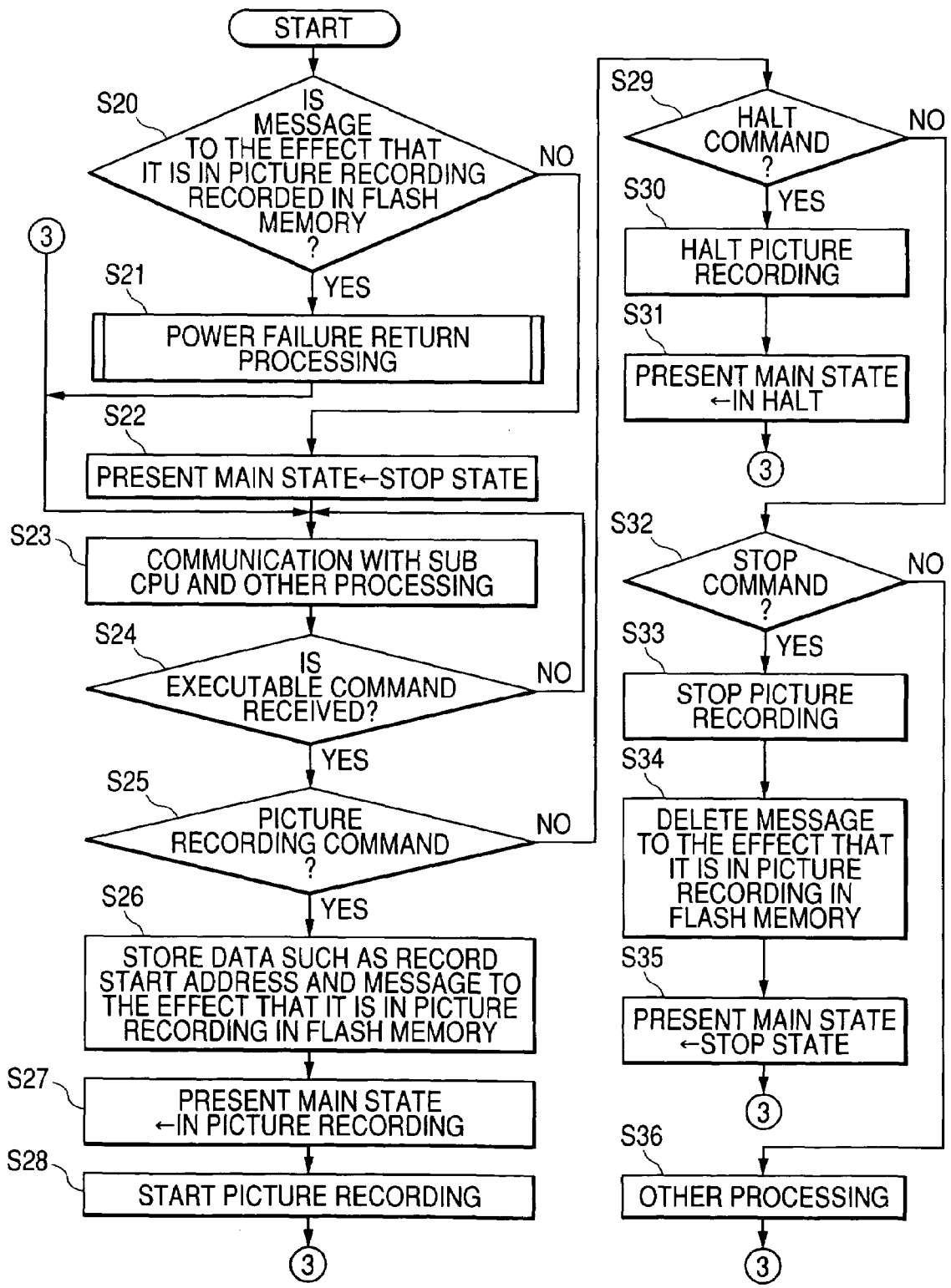
FIG. 5 is a flowchart showing an action of a main CPU.

FIG. 5 is a flowchart showing an action of the main CPU 21. When a power source of the main CPU 21 is turned on, predetermined initialization processing is performed and then, it is checked whether or not a message to the effect that it is in picture recording is stored in the flash memory 24 (S20) When the message is stored, power failure return processing described below is performed (S21). When the message is not stored, a stop state is set to "the present main state" (S22). After S21 or S22 is executed, processing of communication with the sub CPU 41 and other processing are performed (S23). Then, it is checked whether or not an executable command is received from the sub CPU 41 (S24), and when the command is not received, S23 to S24 are repeated until the command is received.

When the executable command is received, it is checked whether or not the executable command is a picture recording command (S25), and when the executable command is the picture recording command, data such as a record start address for picture recording and a message to the effect that it is in picture recording are stored in the flash memory 24 (S26). The record start address is an address of the position A of FIGS. 3A to 3C and is obtained by checking data of the VMG (see FIGS. 2A to 2F) of the DVD-RW. Also, in order to record management information on the DVD-RW, a video attribute, start time, a station number, etc. in addition to the record start address are also stored in the flash memory 24. Then, "in picture recording" is set to "the present main state" (S27). Then, picture recording is started (S28) and the flowchart returns to S23. When the picture recording is started, a signal is sent from the main CPU 21 to the record signal processing part 27, the buffer 28 and the recording and reproducing part 29, and a broadcast signal is recorded on the DVD-RW by cooperation between these hardware and an interrupt processing program (not shown).

When it is not decided that the executable command is the picture recording command in S25, it is checked whether or not the executable command is a halt command (S29), and when it is the halt command; the picture recording is halted (S30) Then, "in halt" is set to "the present main state" (S31) and the flowchart returns to S23. When it is not the halt command, it is checked whether or not the executable command is a stop command (S32), and when it is the stop command, the picture recording is stopped (S33). As a result of this, the picture recording is closed and also management information is recorded in the VMG and the VTSI (see FIGS. 2A to 2F). Then, the message to the effect that it is in picture recording in the flash memory 24 is deleted (S34), and a stop state is set to "the present main state" (S35) and the flowchart returns to S23. When it is decided that it is not the stop command, other processing is performed (S36) and the flowchart returns to S23.

Figure 6:
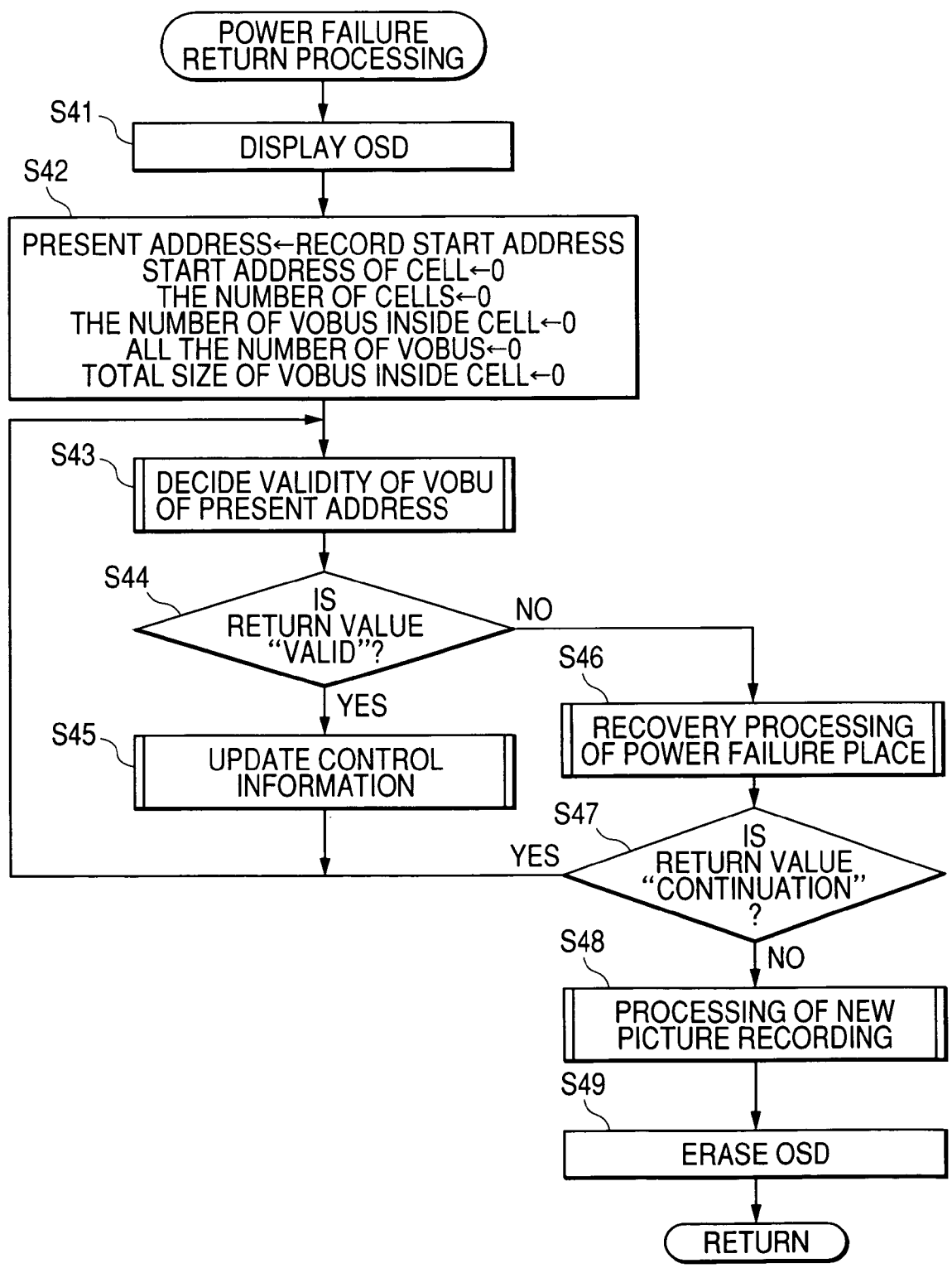
FIG. 6 is a flowchart showing power failure return processing.

FIG. 6 is a flowchart showing power failure return processing. When this function is called, OSD indicating a message to the effect that power failure return processing is performed is displayed on a television image receiver (not shown) (S41). "A present address", "a start address of a cell", "the number of cells", "the number of VOBUs inside a cell", "all the number of VOBUs" and "a total size of VOBUs inside a cell" used in the following description are variables stored in the RAM 23 of the main part 2, and also are control information about the power failure return processing. Then, the contents (address of the position A of FIGS. 3A to 3C) of "a record start address" stored in the flash memory 24 are set to "the present address", and 0 is set to "the start address of the cell", "the number of cells", "the number of VOBUs inside the cell", "all the number of VOBUs" and "the total size of VOBUs inside the cell" (S42).

Figure 7:
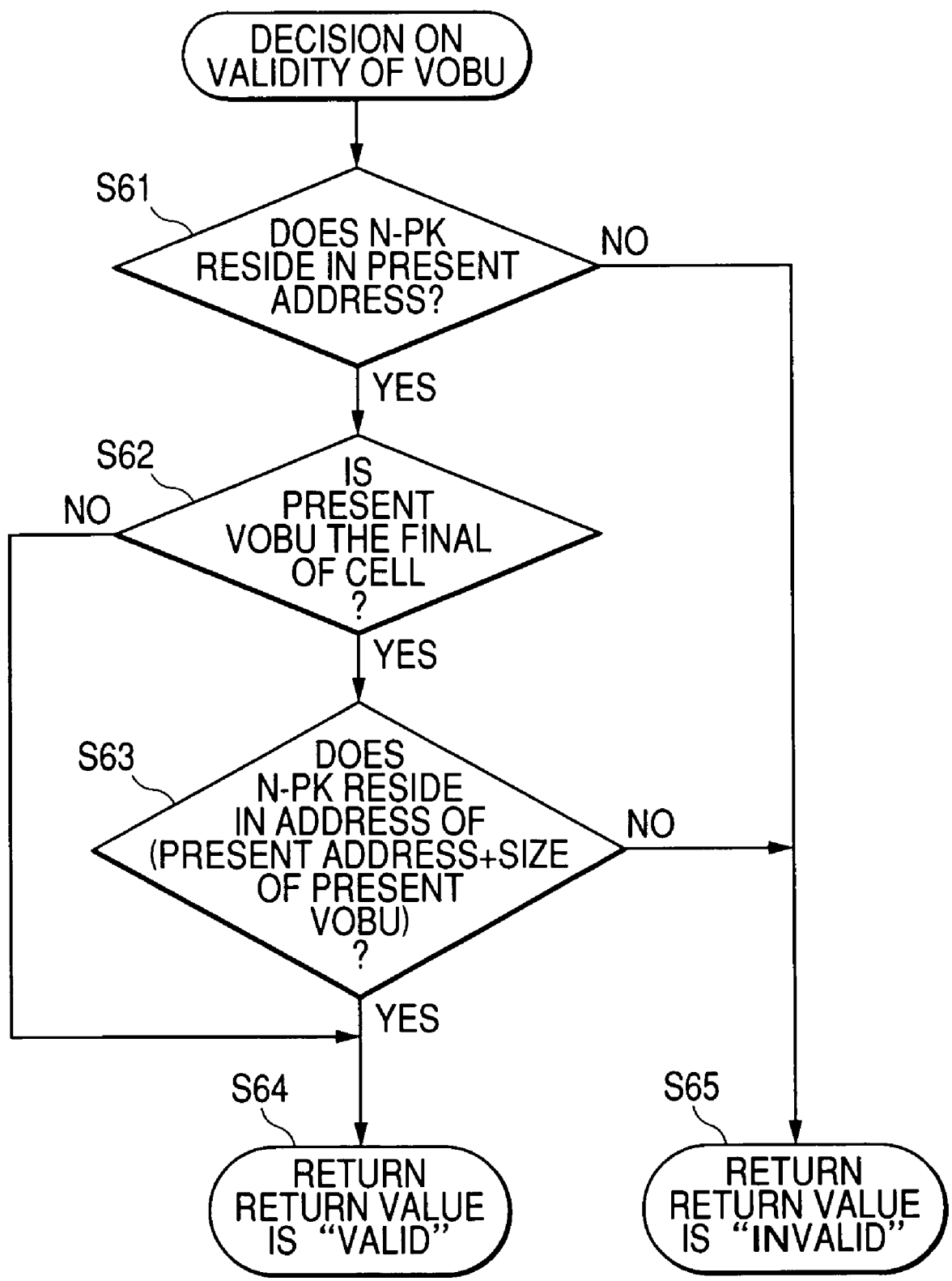
FIG. 7 is a flowchart showing decision processing of validity of a VOBU.
Figure 8:
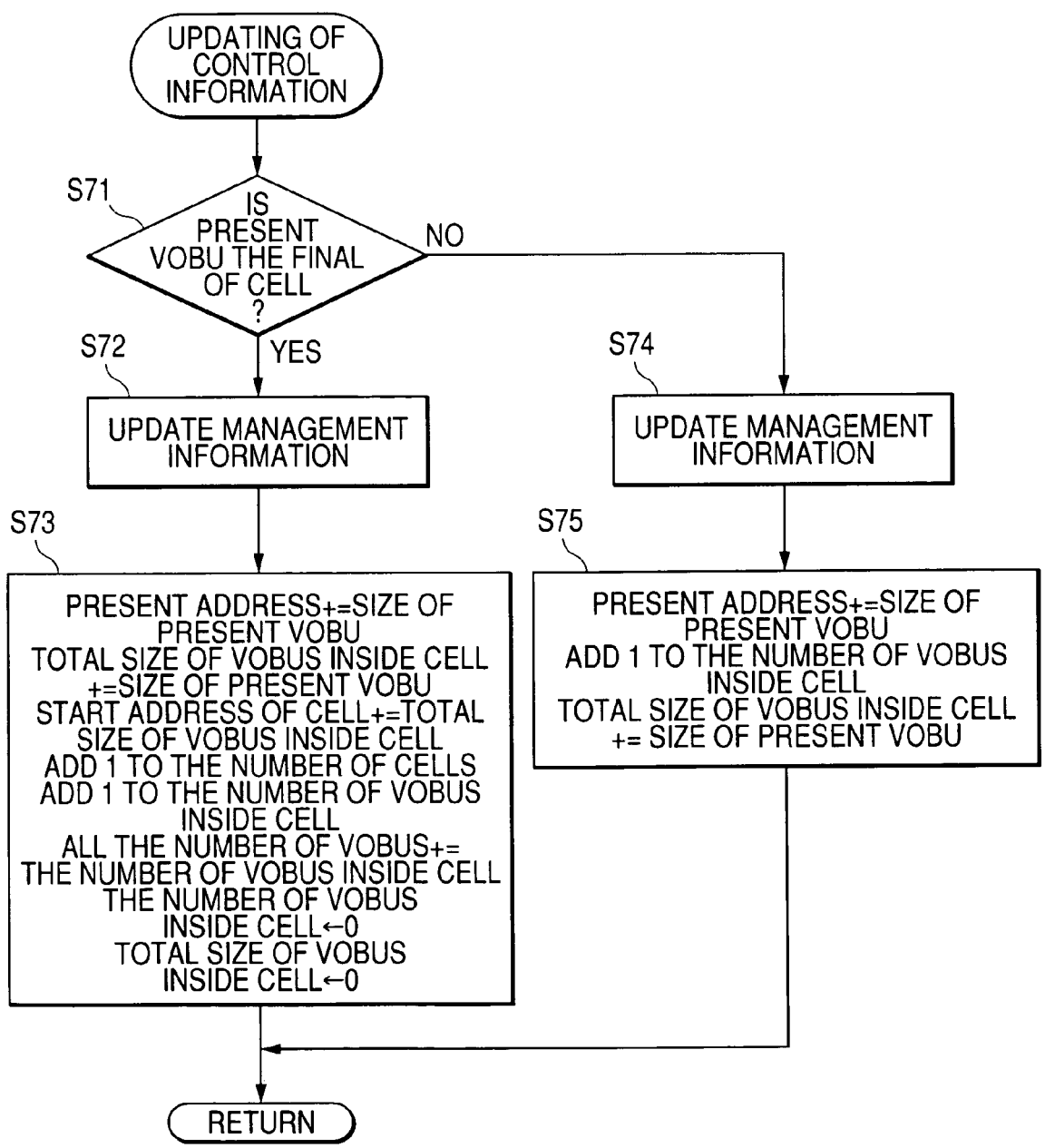
FIG. 8 is a flowchart showing updating processing of control information.
Figure 9:
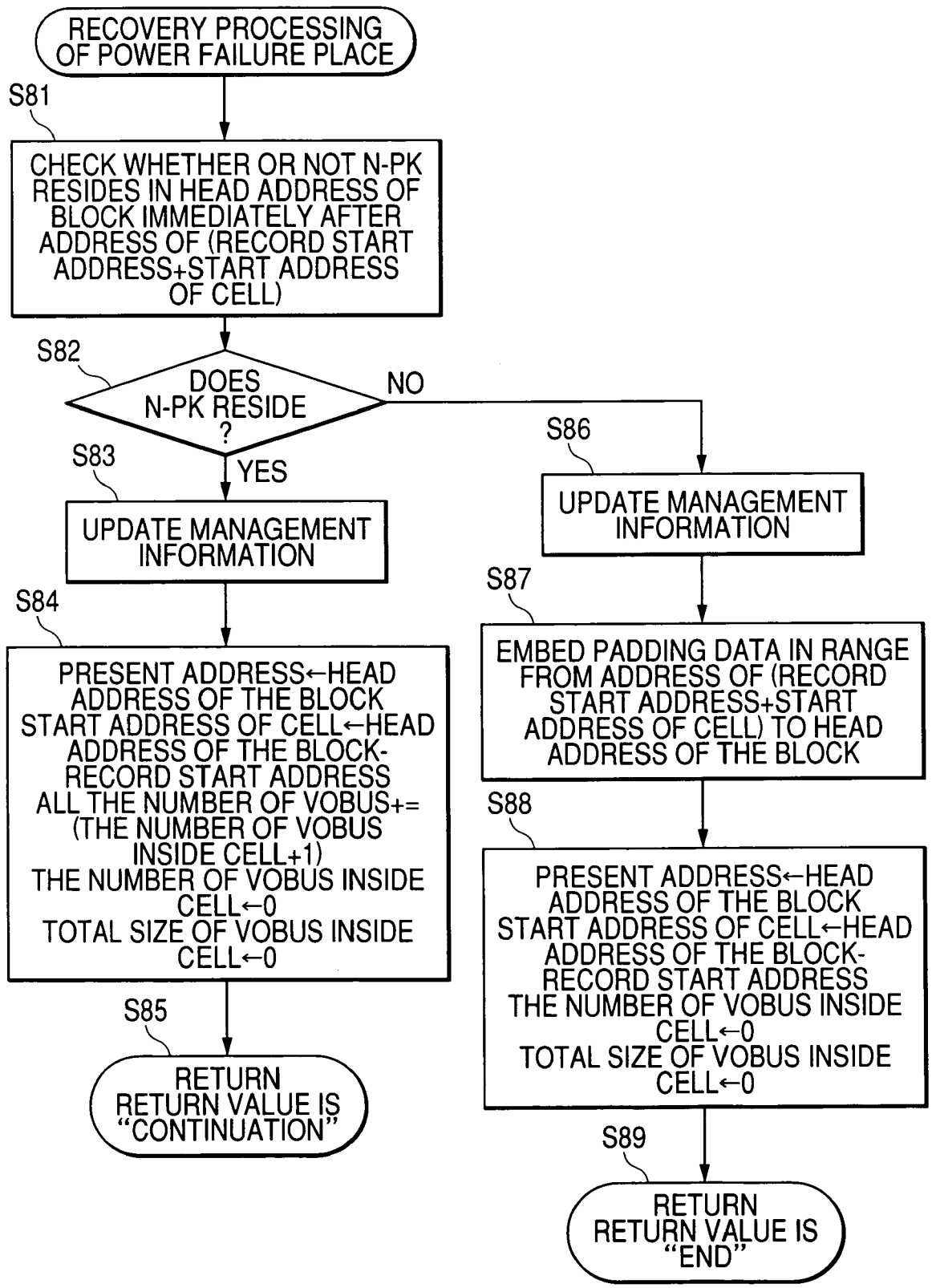
FIG. 9 is a flowchart showing recovery processing of a power failure place.

Next, validity of a VOBU designated by "the present address" is decided by calling the function (S43). This decision method is shown in FIG. 7. It is checked whether or not a return value from the function is "valid" (S44), and when the return value is "valid", the control information is updated (S45) and the flowchart returns to S43 and validity of the next VOBU is decided. An updating method of the control information is shown in FIG. 8. When it is not decided that the return value is "valid", a power failure occurs in a place of the VOBU and by calling the function, recovery processing of the power failure place is performed (S46). The recovery processing of the power failure place is shown in FIG. 9.

Figure 10:
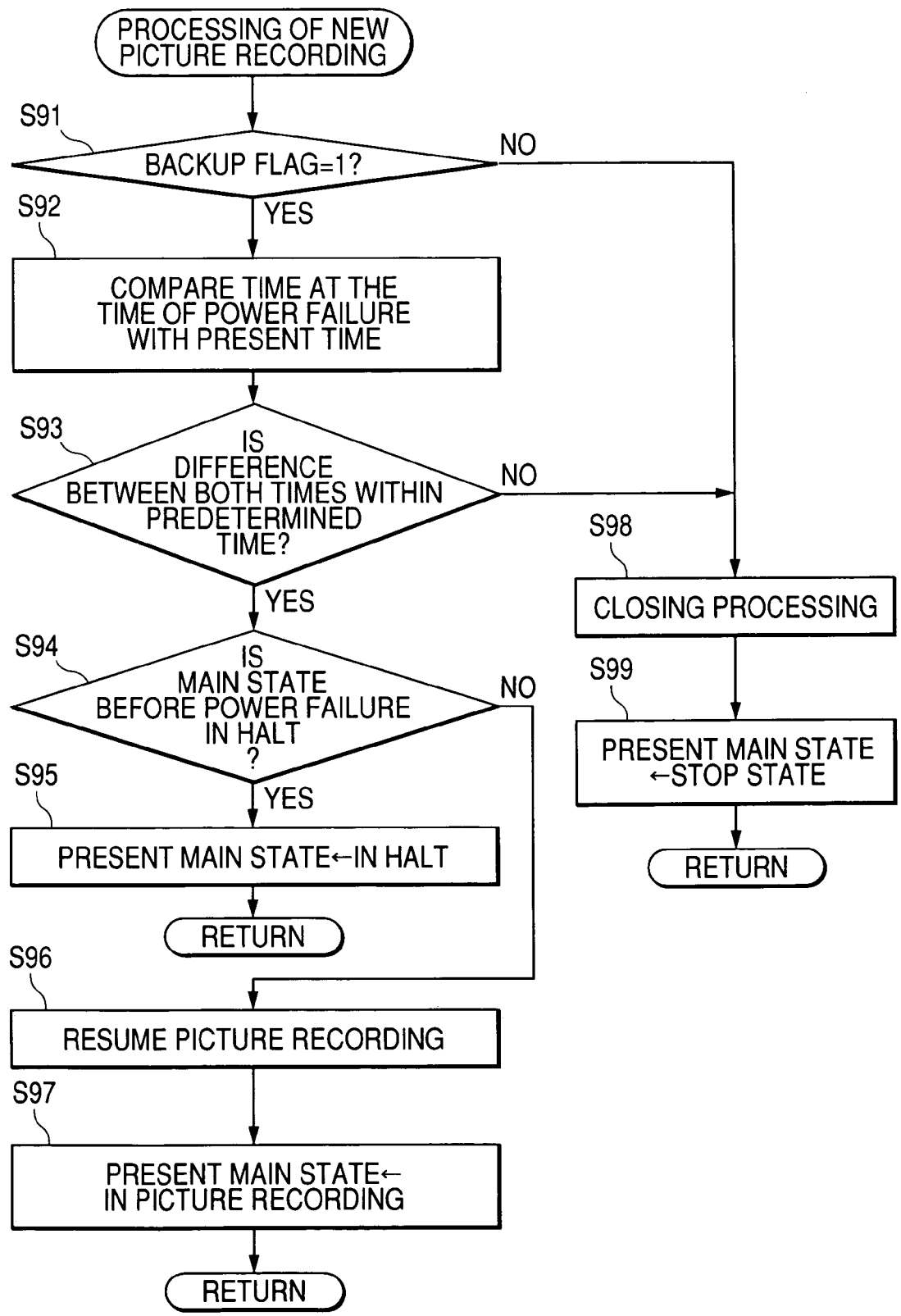
FIG. 10 is a flowchart showing processing of new picture recording.

It is checked whether or not a return value from the function is "continuation" (S47), and when the return value is "continuation", the flowchart returns to S43. Incidentally, the "continuation" is achieved in the case that a valid VOBU has been recorded in the back of the padding data P (see FIG. 3C). When it is not decided that the return value is "continuation", processing of new picture recording is performed (S48). The processing of new picture recording is shown in FIG. 10. Incidentally, the new picture recording means picture recording of a broadcast signal after a power failure return. Then, the OSD is erased (S49) and the flowchart returns to the call source.

FIG. 7 is a flowchart showing decision processing of validity of a VOBU. It is checked whether or not an N-PK resides in an address designated by the contents of "the present address" (S61). Here, validity of the contents of the N-PK which is control data is also checked together. When it is not decided that the N-PK resides, the VOBU is not valid, so that a return value is set to "invalid" and the flowchart returns to the call source (S65). When it is decided that the N-PK resides, it is checked whether or not the VOBU (the present VOBU) is the final VOBU of a cell (S62), and when it is not the final VOBU of the cell, a return value is set to "valid" and the flowchart returns to the call source (S64).

When it is decided that it is the final VOBU of the cell in S62, it is checked whether or not the N-PK resides in an address (that is, a position of the next VOBU) designated by a value in which a size of the present VOBU is added to the contents of "the present address" (S63). Incidentally, the size of the present VOBU is recorded in the N-PK. Also, the reason why the decision of S63 is made only when the present VOBU is the final VOBU of the cell is because "the start address of the cell" etc. are updated in updating processing of the control information. When it is decided that it is YES in S63, data is correctly recorded to the end of the cell, so that a return value is set to "valid" and the flowchart returns to the call source (S64). When it is decided that it is NO in S63, it is not ensured that data is correctly recorded to the end of the cell, so that a return value is set to "invalid" and the flowchart returns to the call source (S65).

FIG. 8 is a flowchart showing updating processing of the control information. When this function is called, it is checked whether or not the present VOBU is the final VOBU of a cell (S71). When it is the final VOBU of the cell, in consideration of the fact that it is the final VOBU of the cell, management information recorded in the VMG and the VTSI (see FIGS. 2A to 2F) later is updated with reference to the variables "the start address of the cell", "the number of VOBUs inside the cell" and so on (S72). Incidentally, this management information is also stored in the RAM 23 of the main part 2. Next, a size of the present VOBU is added to "the present address", and the size of the present VOBU is added to "the total size of VOBUs inside the cell", and the contents of "the total size of VOBUs inside the cell" are added to "the start address of the cell", and 1 is added to "the number of cells", and 1 is added to "the number of VOBUs inside the cell", and the contents of "the number of VOBUs inside the cell" are added to "all the number of VOBUs", and 0 is set to "the number of VOBUs inside the cell" and "the total size of VOBUs inside the cell" (S73), and the flowchart returns to the call source. "X+=Y" in FIG. 8 means that a result in which Y is added to the contents of X is substituted into X.

When it is not decided that it is the final VOBU of the cell in S71, the management information is updated (S74) in consideration of the fact that it is not the final VOBU of the cell. Then, a size of the present VOBU is added to "the present address", and 1 is added to "the number of VOBUs inside the cell", and the size of the present VOBU is added to "the total size of VOBUs inside the cell" (S75), and the flowchart returns to the call source.

FIG. 9 is a flowchart showing recovery processing of a power failure place. When this function is called, it is checked whether or not an N-PK resides in an address (an address of the position C of FIGS. 3A to 3C) of a block immediately after an address (an address of the position B of FIGS. 3A to 3C) of (the contents of "the record start address"+the contents of "the start address of the cell") (S81). In the case of FIG. 3C, the VOBU #m is recorded from an address of the position C, so that the N-PK resides in the address.

Next, it is decided whether or not the N-PK resides (S82), and when the N-PK resides, management information is updated in consideration of the fact that the next VOBU starts from the position C (S83). Then, the address (address of the position C) of the block (the block) immediately after the address of (the contents of "the record start address"+the contents of "the start address of the cell") is set to "the present address", and a value in which the contents of "the record start address" are subtracted from the address of the position C is set to "the start address of the cell", and (the contents of "the number of VOBUs inside the cell"+1) are added to "all the number of VOBUs", and "the number of VOBUs inside the cell" and "the total size of VOBUs inside the cell" are set to 0 (S84). Thereafter, a return value is set to "continuation" and the flowchart returns to the call source (S85).

When it is decided that it is NO in S82, the management information is updated in consideration of the fact that there is an invalid VOBU in data of a VOBU decided that the VOBU is once valid (VOBUs #5 to #8 (cell #2) are invalid in an example of FIG. 3B) and the fact that a VOBU of new data starts from the position C (S86). Then, padding data P is embedded in a range (space area D) from an address (address of the position B) of (the contents of "the record start address"+the contents of "the start address of the cell") to an address of the position C (S87). Then, the address (address of the position C) of the block immediately after the address of (the contents of "the record start address"+the contents of "the start address of the cell") is set to "the present address", and a value in which the contents of "the record start address" are subtracted from the address (address of the position C) of the block is set to "the start address of the cell", and 0 is set to "the number of VOBUs inside the cell" and "the total size of VOBUs inside the cell" (S88). Then, a return value is set to "end" and the flowchart returns to the call source.

FIG. 10 is a flowchart showing processing of new picture recording. When this function is called, it is checked whether or not "the backup flag" is 1 (S91), and when it is 1, time at the time of occurrence of a power failure is compared with the present time (S92). The reason why a value of "the backup flag" is checked thus is because when the flag is 1, a power source of the RAM 43 of the sub part 4 is also backed up and time data at the time of occurrence of the power failure stored therein is also valid and the time is updated also during the power failure and the present time is also valid.

Next, it is checked whether or not a difference between both the times is within a predetermined time (for example, 10 minutes) (S93), and when the difference is within the predetermined time, it is checked whether or not "the main state before the power failure" is in halt (S94). When it is in halt, "in halt" is set to "the present main state" (S95) and the flowchart returns to the call source. When it is not in halt, picture recording is resumed (S96) and "in picture recording" is set to "the present main state" (S97) and the flowchart returns to the call source.

When it is decided that it is NO in S91 or S93, closing processing of the picture recording is performed (S98). In the closing processing, a black screen and a sequence end code are recorded when the sequence end code is not included in the final VOBU. Further, various management information is recorded in the VMG and the VTSI. Incidentally, before the closing processing is performed, it may be constructed so that OSD indicating whether or not picture recording is continued to a viewer is displayed and it is determined whether or not the picture recording is continued according to instructions of the viewer. Then, a stop state is set to "the present main state" (S99) and the flowchart returns to the call source.

In the embodiment described above, the case that a power source of the sub CPU 41 is backed up has been described, but the invention can be implemented also in the case that the power source is not backed up. In this case, the flowchart of FIG. 4 is shown below. After a power source is turned on, execution is performed in a sequence of S1 and S6 after predetermined initialization processing is performed. That is, S2 to S5 are not present. Also, "return to S2" shifts to "return to S7". In this case, a value of "the backup flag" is always 0 and "the main state before the power failure" shifts to a meaningless variable.

Also, in the embodiment, the case using the sub CPU 41, the main CPU 21, the RAM 43 of the sub part 4 in which a power source is backed up, the volatile RAM 23 of the main part 2 and the nonvolatile flash memory 24 has been described, but it is not limited to this. For example, the invention can be implemented even when a CPU is only one. Also, when a power source of the RAM 23 of the main part 2 is backed up, the need for the flash memory 24 is eliminated. Also, instead of the flash memory 24 in which the number of writings is limited in specifications, when nonvolatile memory without such a limit is used, the need for the RAM 23 of the main part 2 is eliminated.

Further, in the embodiment, since there is a limit to the number of writings of the flash memory 24, only the required minimum of data is stored in the flash memory 24, but it can also be constructed so that by storing various control information about a start address etc. of the nearest valid cell in the nonvolatile memory without such a limit, validity is not checked from a VOBU of the head and validity is checked from a VOBU of a cell next to the nearest valid cell in return processing after a power failure.

Further, in the embodiment, the case that the padding data P is embedded in the space area D of a block has been described, but it may be constructed so that new data after a power return is recorded from a portion immediately after the valid cell without embedding the padding data P. Further, in the embodiment, the case of recording data on the DVD-RW of DVD-Video standards has been described, but the invention can also be applied to record media of other formats and record media other than the disk.

According to the invention, even in case that a power failure occurs while data of video or audio is recorded on a record medium, recording can be made subsequently after a power return.

What is claimed is:

1. A disk recording/reproducing apparatus comprising:
a recording part which performs recording in which video or audio data is recorded on a disk;
an operation part having a plurality of keys;
a main control part which controls the recording part;
a sub control part which controls the operation part; and
a storage part configured to store information indicating that the recording has started and a record position of data on the disk,
wherein
in a case that power recovers from a power failure, when the storage part stores the information indicating that the recording has started, the main control part searches data recorded based on the record position in a unit of first logical data, checks validity of control data in the first logical data, and obtains a first position of final valid first logical data, which is specified as a last position,
wherein
when the first position is not a boundary of second logical data, the main control part obtains a second position of final valid second logical data, which is specified as a last position,
the second logical data includes a plurality of first logical data, and the final valid second logical data includes only the valid first logical data, and wherein
the main control part records subsequently new data on the disk from a position next to the last positions,
wherein the storage part further stores a time when a power failure occurs, and
the main control part compares a present time with the time when the power failure occurs and determines whether recording is subsequently made or the recording is ended based on a comparison result.

2. A data recording apparatus comprising:
a recording part which performs recording in which video or audio data is recorded on a record medium;
a control part which controls the recording part;
a storage part configured to store information indicating that the recording has started and a record position of data on the record medium,
wherein
in a case that power recovers from a power failure, when the storage part stores the information indicating that the recording has started, the control part searches data recorded based on the record position in a unit of logical data, checks validity of control data in the logical data, obtains a first position of final valid logical data, and subsequently records new data on the record medium from a position next to the first position,
wherein the storage part further stores a time when a power failure occurs, and
the control part compares a present time with the time when the power failure occurs and determines whether recording is subsequently made or the recording is ended based on a comparison result.

3. The data recording apparatus as claimed in claim 2, wherein the record position is a position in which a first logical data is recorded, and
the control part searches sequentially from the first logical data.

4. The data recording apparatus as claimed in claim 3, wherein in a case of subsequently recording the new data, the control part embeds padding data in a space area of a physical block in which the final valid logical data is recorded.

5. The data recording apparatus as claimed in claim 4, wherein the control part skips the padding data during searching.

6. The data recording apparatus as claimed in claim 5, wherein the storage part further stores a time when a power failure occurs, and
wherein
the control part compares a present time with the time when the power failure occurs and determines whether recording is subsequently made or the recording is ended based on a comparison result.

7. The data recording apparatus as claimed in claim 3, wherein the storage part further stores a time when a power failure occurs, and
wherein
the control part compares a present time with the time when the power failure occurs and determines whether recording is subsequently made or the recording is ended based on a comparison result.

8. The data recording apparatus as claimed in claim 4, wherein the storage part further stores a time when a power failure occurs, and
wherein
the control part compares a present time with the time when the power failure occurs and determines whether recording is subsequently made or the recording is ended based on a comparison result.

9. The data recording apparatus as claimed in claim 2, wherein in a case of subsequently recording the new data, the control part embeds padding data in a space area of a physical block in which the final valid logical data is recorded.

10. The data recording apparatus as claimed in claim 9, wherein the control part skips the padding data during searching.

11. The data recording apparatus as claimed in claim 10, wherein the storage part further stores a time when a power failure occurs, and
wherein
the control part compares a present time with the time when the power failure occurs and determines whether recording is subsequently made or the recording is ended based on a comparison result.

12. The data recording apparatus as claimed in claim 9, wherein the storage part further stores a time when a power failure occurs, and
wherein
the control part compares a present time with the time when the power failure occurs and determines whether recording is subsequently made or the recording is ended based on a comparison result.

13. A disk recording/reproducing method executed in a recording/reproducing apparatus, comprising:
performing recording in which video or audio data is recorded on a disk,
storing information indicating that the recording has started and a record position of data on the disk in a storage part of the recording/reproducing apparatus,
searching data recorded based on the record position of data on the disk in a unit of first logical data when power recovers from a power failure, and when information indicating that the recording has started is stored,
storing a time when a power failure occurs,
comparing a present time with the time when the power failure occurs and determines whether recording is subsequently made or the recording is ended based on a comparison result,
checking validity of control data in the first logical data,
obtaining a first position as a last position of final valid first logical data,
when the first position is not a boundary of second logical data, obtaining a second position as a last position of final valid second logical data, and
recording subsequently new data on the disk from a position next to the last position,
wherein
the second logical data includes a plurality of first logical data, and
the final valid second logical data includes only the valid first logical data.

* * * * *